UNITED STATES PATENT OFFICE.

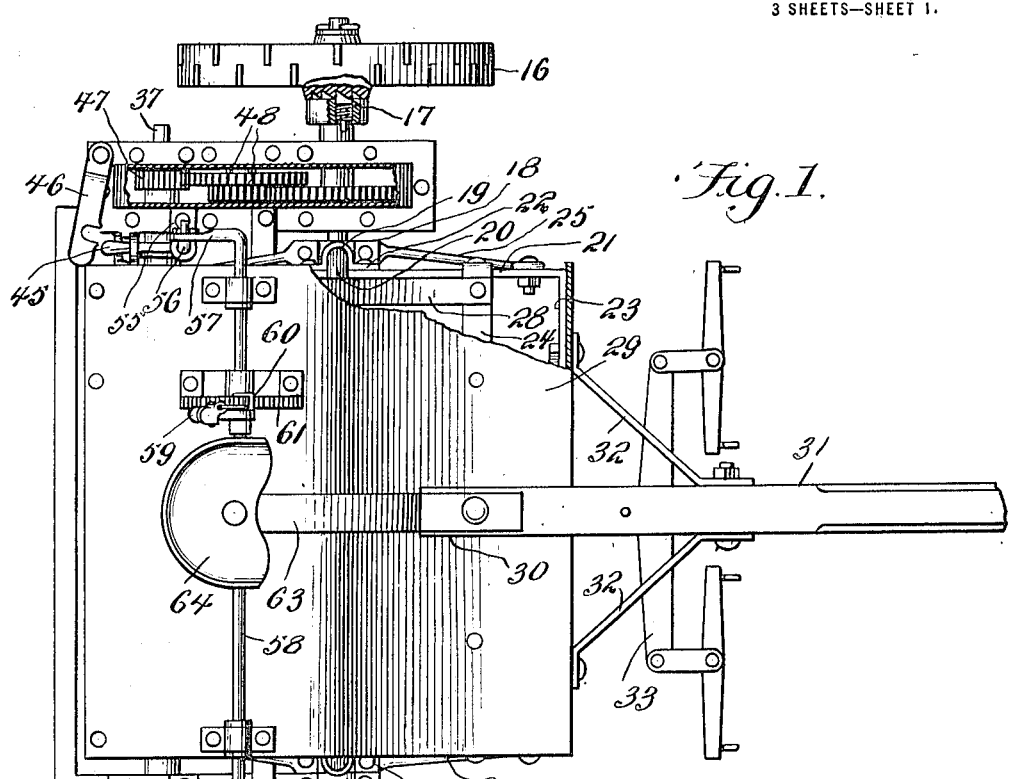
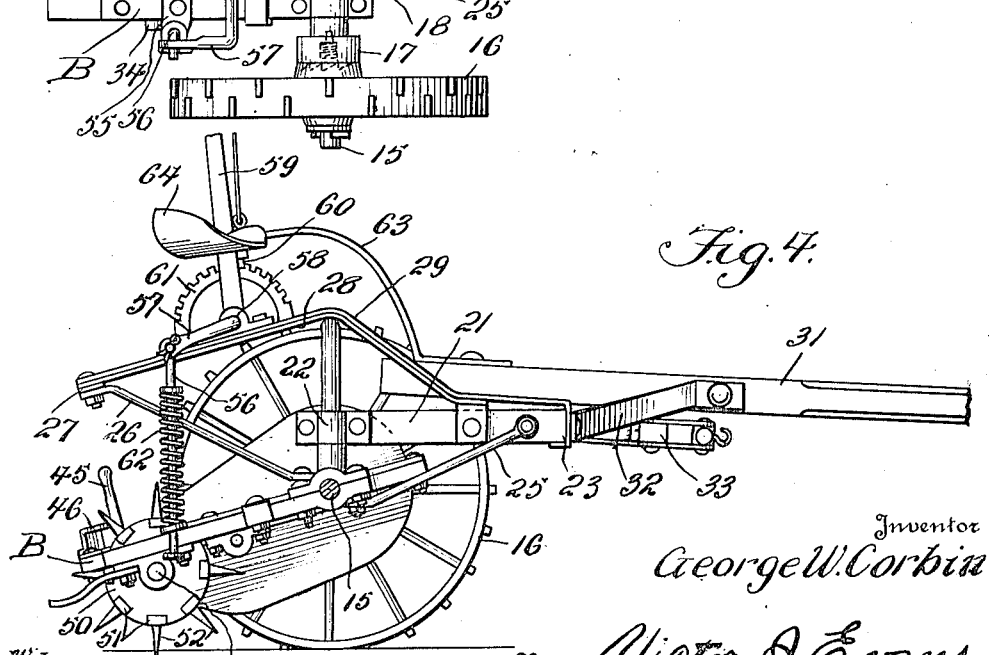

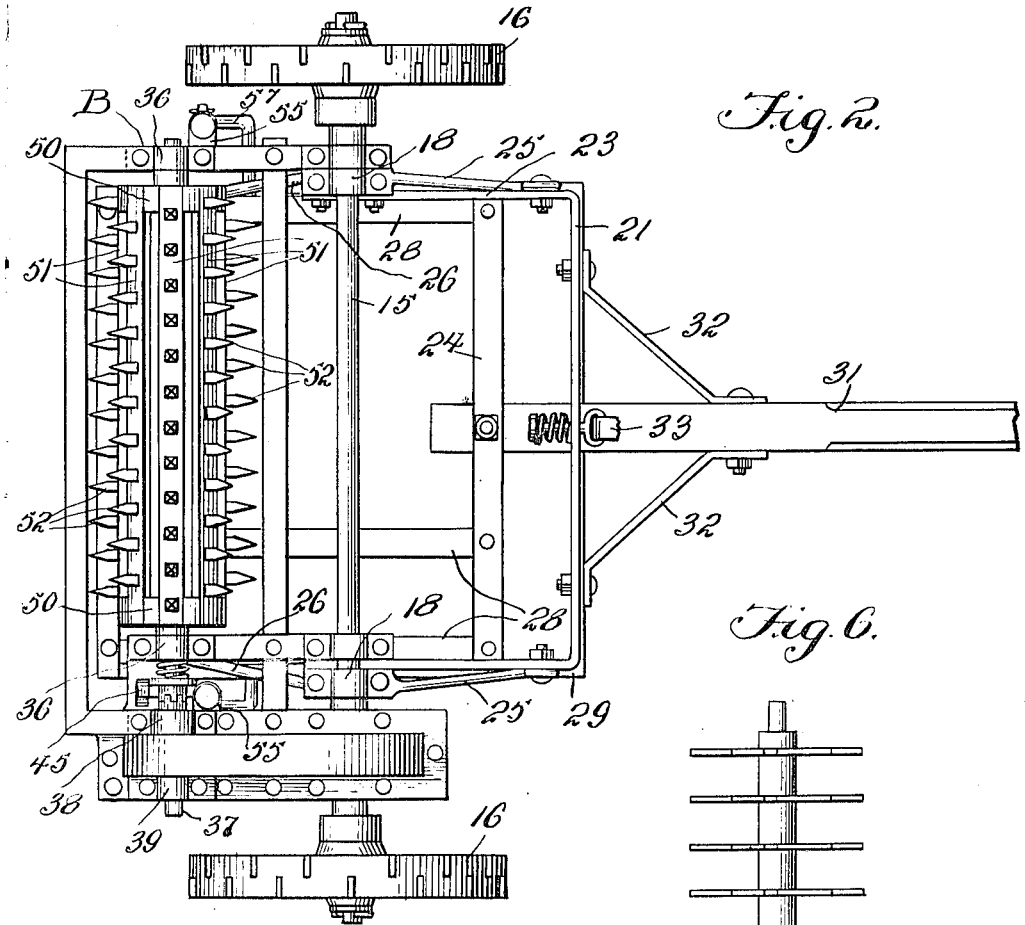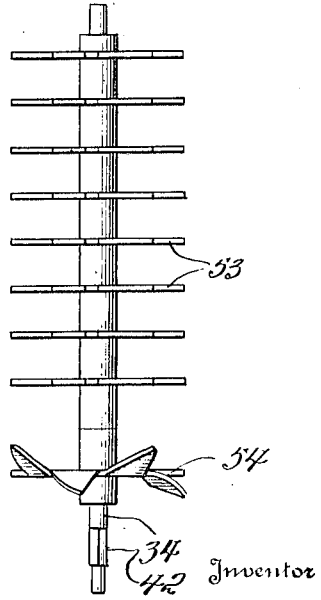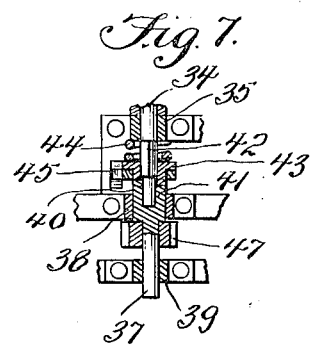

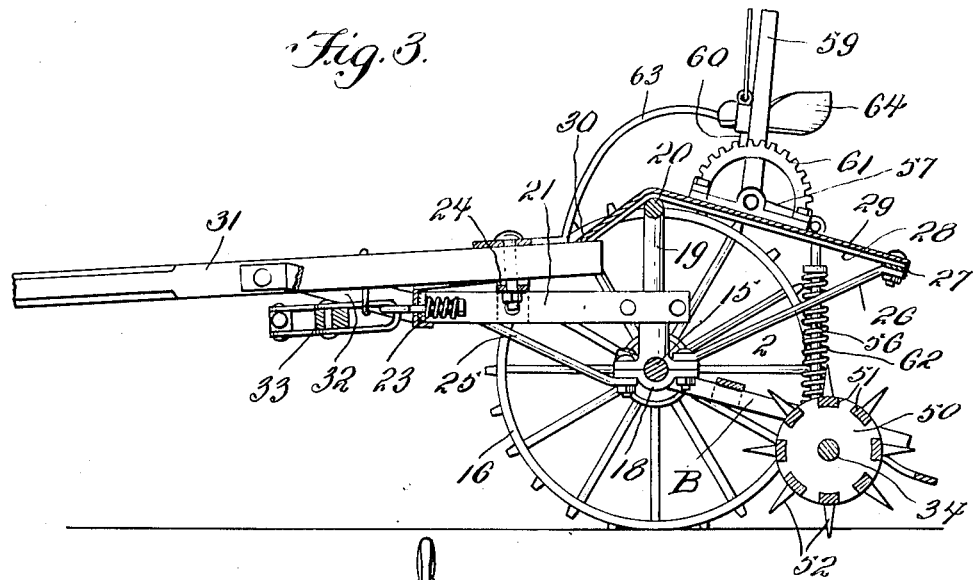
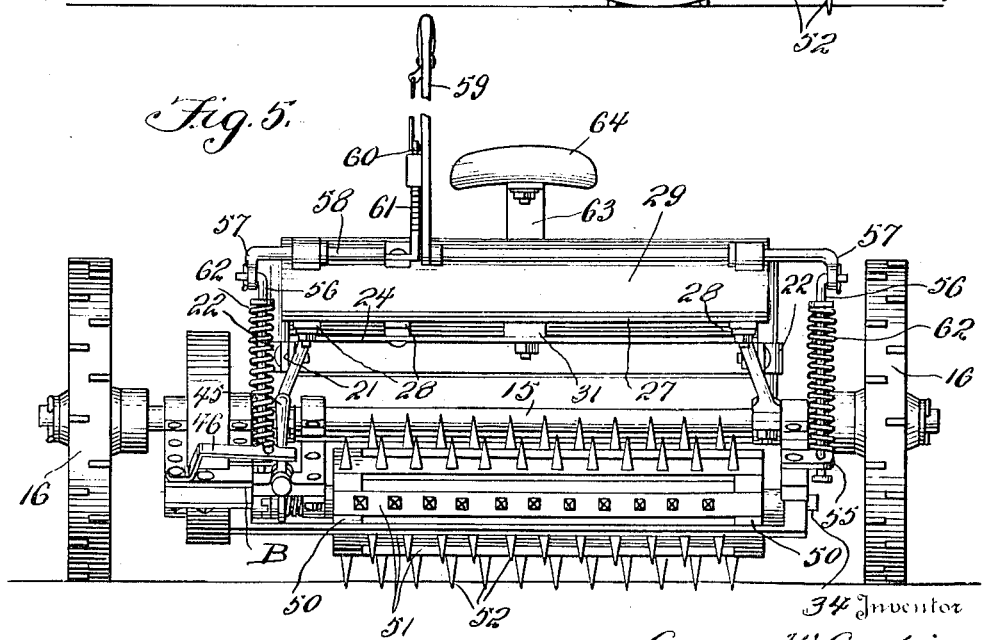

GEORGE W. CORBIN, OF BLOOMINGTON, TEXAS.

COMBINATION FARMING IMPLEMENT.

1,285,950.   Specification of Letters Patent.   Patented Nov. 26, 1918.

Application filed February 2, 1918. Serial No. 215,129.

*To all whom it may concern:*

Be it known that I, GEORGE W. CORBIN, a citizen of the United States, residing at Bloomington, in the county of Victoria and State of Texas, have invented new and useful Improvements in Combination Farming Implements, of which the following is a specification.

This invention relates to agricultural implements and particularly to soil tilling machines of the rotary type.

One object of the invention is to produce a machine of the class described of simple and improved construction embodying a carrying frame, a swingingly supported adjustable frame, and a rotary tilling device mounted on the swinging frame for direct engagement with the ground, said rotary element being mounted in such a fashion that it may be readily exchanged for one of a different construction.

A further object of the invention is to produce a machine of the class described having simple and improved means for effecting adjustment of the swingingly supported frame and for transmitting motion from the supporting wheels of the machine to the rotary element carried by the swinging frame.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a top plan view of a machine in accordance with the invention, portions of the shield or casing having been broken away.

Fig. 2 is a bottom plan view.

Fig. 3 is a longitudinal sectional view.

Fig. 4 is a side elevation.

Fig. 5 is a rear elevation.

Fig. 6 is a detail view of a shaft carrying ground engaging implements different than those seen in the remaining figures.

Fig. 7 is a sectional detail view taken through the clutch mechanism whereby the implement carrying shaft is driven.

Corresponding parts in the several figures are denoted by like characters of reference.

The carrying axle 15 of the machine is provided with ground wheels 16 with which it is connected by clutch devices 17 of well known construction whereby the axle is rotated when the machine is traveling in a forward direction while when the machine is backed the axle will not rotate. The axle is mounted for rotation in bearings 18 at the lower ends of the limbs 19 of an arch 20. The arch supports a forwardly extending yoke which is positioned in an approximately horizontal plane, the limbs 21 of said yoke being firmly secured on the limbs 19 of the arch by means of clips 22, the bridge piece 23 being thereby spaced forwardly with respect to the axle 15 and the arch 20. The limbs of the yoke are connected together to the rearward of the bridge piece 23 by a cross bar 24, and said limbs are also connected with the boxes or bearing members 18 by means of inclined brace rods 25. Bolted on the bearing members 18 are the lower ends of inclined brace rods 26, the upper ends of which are connected together and spaced apart by a cross bar 27. The bars 26 and cross bar 27 are connected together by frame bars or straps 28, said frame bars being suitably bent intermediate the ends thereof and carried over the arch 20. The frame bars 28 together with the bar 24, the cross bar 27 and the bridge piece 23 constitute a frame structure on which a shield or casing 29 is mounted or suitably secured. The shield 29 has a slot 30 for the reception of the rearward end of the tongue 31, said tongue being supported on and securely connected with the bridge piece 23 and the cross bar 24. The tongue is also connected with the bridge piece 23 by means of hounds 32 and an evener 33 is suitably mounted for the attachment of draft direct to the frame structure.

Swingingly supported on the axle 15 is a frame generally designated by B and which serves to support the rotary ground engaging tilling mechanism and also means for transmitting motion from one of the ground wheels to said mechanism. The shaft 34 which supports the tilling mechanism is mounted for rotation in bearings 35, 36, said bearings consisting of boxes of well known construction. Another shaft 37 is supported in bearings 38, 39 in axial alinement with the shaft 34, said shaft 37 having a stationary clutch member 40 and a socket 41 at the inner end thereof, said socket being adapted to receive the proximate end of the shaft 34 which is of cylindrical form for engagement with said socket in which it may rotate. The shaft 34 has a square of non-circular portion 42 on which is slidably mounted a clutch member 43 which is normally forced in engagement with the clutch member 40 by the action of a spring 44. A lever 45 is provided whereby the clutch member 43 may be moved out of engagement with the clutch member 40 and a pivoted catch member 46 is provided to engage the lever 45 when the latter is adjusted to throw the clutch out. The shaft 37 carries a pinion 47 which is connected through the medium of intermediate gearing 48 with a spur wheel 49 associated with the clutch 17 of one of the ground wheels so that by rotation of the latter in a forward direction the shaft 37 will be driven, said shaft serving obviously to drive the shaft 34 when the clutch members 40 and 43 are in engagement with each other.

The shaft 34 has been shown in Figs. 1 to 5, inclusive, as carrying a tilling device comprising a cylinder including heads 50 and slats or spacing members 51, said slats being provided with radially extending teeth 52 which may be connected therewith in any convenient manner. In Fig. 6 there has been shown a shaft 34 on which disks 53 and disk plows 54 have been mounted, it being obvious that disks or plows of any convenient and well known construction may be used. A shaft carrying such disks or plows or ground engaging digging elements of any well known construction adapted for the purpose may be substituted in the frame of the machine for the shaft carrying cylinder shown in Figs. 1 to 5 inclusive by simply removing the bearing members 35, 36 when the exchange may be very easily and very quickly effected. The machine in this simple manner will be adapted for use in connection with shafts carrying tilling implements or digging devices of a great many different kinds.

The frame B is provided with lugs 55 apertured for the passage of lifting rods 56 which are pivotally connected with the cranks 57 of a rock shaft 58 which is journaled in bearings on top of the shield or casing, said rock shaft having a hand lever 59 whereby it may be conveniently rocked and said lever being equipped with a latch 60 adapted to engage a rack segment 61 whereby the parts may be retained securely in adjusted position. Coiled about the lifting rods 56 are springs 62 exerting downward pressure on the lugs 55 thereby tending to move the frame carrying the tilling devices in a groundward direction. By means of the hand lever 59 the parts may be easily lifted to a convenient position for transportation.

The tongue 31 has mounted thereon a spring 63 carrying a seat 64 for the driver or operator.

From the foregoing description taken in connection with the drawings hereto annexed the operation and advantages of this invention will be readily understood. The construction of the improved machine is simple and inexpensive and of such a nature as to enable tilling devices of various kinds to be conveniently used in connection therewith. The shield or casing protects the operator from dirt thrown by the machine and said casing with the carrying frame is mounted on the axle in such a manner as to make provision for the convenient adjustment of the swinging frame carrying the tilling mechanism.

Having described the invention what I claim as new is:

1. In an implement of the class described, an axle having ground wheels, an arch having bearing members supported on the axle, a frame structure connected with the arch and including a yoke, the limbs of which are fastened securely on the limbs of the arch, said yoke having a bridge piece and a cross bar, and a draft tongue supported on and securely connected with the bridge piece and the cross bar.

2. In an implement of the class described, an axle having ground wheels, an arch having bearings supported on the axle, and a forwardly extending yoke the limbs of which are firmly secured on the limbs of the axle, said yoke having a bridge piece and a cross bar, brace members extending upwardly and rearwardly from the bearings of the arch, a cross bar supported by said braces, longitudinal frame bars connecting the last-mentioned cross bar with the cross bar of the yoke, and a shield supported on said cross bars and longitudinal frame bars and also on the bridge piece of the yoke.

3. In an implement of the class described, an axle having ground wheels, an arch having bearings supported on the axle, and a forwardly extending yoke the limbs of which are firmly secured on the limbs of the axle, said yoke having a bridge piece and a cross bar, brace members extending upwardly and rearwardly from the bearings of the arch, a cross bar supported by said braces, longitudinal frame bars connecting the last-mentioned cross bar with the cross bar of the yoke, and a shield supported on said cross bars and longitudinal frame bars and also on the bridge piece of the yoke, said shield having a slot, and a tongue extending through said slot and supported on the bridge piece and the cross bar of the yoke with which said tongue is securely connected.

4. In an implement of the class described, a frame having an axle and ground wheels, a second frame swingingly mounted on the axle, a short shaft supported for rotation on the swinging frame and geared to and driven by one of the ground wheels, said shaft having a socket and a clutch member, a second shaft supported for rotation on the swinging frame in axial alinement with the short shaft and having a rounded portion engaging the socket in the latter, means including a spring actuated clutch member for connecting the second shaft for rotation with the first-mentioned short shaft, and tilling implements carried by the second shaft.

5. In an implement of the class described, a frame having an axle and ground wheels, a second frame swingingly mounted on the axle, a short shaft supported for rotation on the swinging frame and geared to and driven by one of the ground wheels, said shaft having a socket and a clutch member, a second shaft supported for rotation on the swinging frame in axial alinement with the short shaft and having a rounded portion engaging the socket in the latter, means including a spring actuated clutch member for connecting the second shaft for rotation with the first-mentioned short shaft, and tilling implements carried by the second shaft, said second shaft being detachably mounted on the swinging frame for convenient interchange with a similar shaft carrying differently constructed tilling implements.

6. In a machine of the class described, a frame having an axle and ground wheels, a second frame swingingly mounted on the axle, means to raise and lower the second frame, a short shaft mounted for rotation on the swinging frame and geared to and driven by one of the ground wheels, a second shaft also mounted for rotation on the swinging frame and arranged in line with the short shaft, tilling implements carried by the second shaft, and means to couple the second shaft to the short shaft for rotation thereby, said coupling means enabling said second shaft to be disconnected from said short shaft.

In testimony whereof I affix my signature.

GEORGE W. CORBIN.